United States Patent
Paul

(10) Patent No.: US 11,201,989 B2
(45) Date of Patent: Dec. 14, 2021

(54) PROCESSING OF IMPULSE NOISE IN A VIDEO SEQUENCE

(71) Applicant: ELECTRICITE DE FRANCE, Paris (FR)

(72) Inventor: Nicolas Paul, Montreuil (FR)

(73) Assignee: ELECTRICITE DE FRANCE, Paris (FR)

( * ) Notice: Subject to any disclaimer, the term of this patent is extended or adjusted under 35 U.S.C. 154(b) by 0 days.

(21) Appl. No.: 17/254,450

(22) PCT Filed: Jun. 3, 2019

(86) PCT No.: PCT/EP2019/064297
§ 371 (c)(1),
(2) Date: Dec. 21, 2020

(87) PCT Pub. No.: WO2020/001922
PCT Pub. Date: Jan. 2, 2020

(65) Prior Publication Data
US 2021/0152713 A1 May 20, 2021

(30) Foreign Application Priority Data
Jun. 29, 2018 (FR) ...................................... 18 55955

(51) Int. Cl.
*G06T 5/00* (2006.01)
*H04N 5/213* (2006.01)
(Continued)

(52) U.S. Cl.
CPC ............. *H04N 5/213* (2013.01); *G06T 5/002* (2013.01); *G06T 5/20* (2013.01); *H04N 5/217* (2013.01);
(Continued)

(58) Field of Classification Search
CPC .......... H04N 5/213; H04N 5/217; H04N 5/21; H04N 5/144; H04N 5/145; H04N 9/646;
(Continued)

(56) References Cited

U.S. PATENT DOCUMENTS 4,058,836 A 11/1977 Drewery et al.
5,543,858 A 8/1996 Wischermann
(Continued)

FOREIGN PATENT DOCUMENTS

EP 1 550 981 A2 7/2005
FR 2 309 095 A1 11/1976

OTHER PUBLICATIONS

Reza, "Adaptive Noise Filtering of Image Sequences in Real Time," WSEAS Transactions on Systems, Apr. 30, 2013, vol. 12(4), pp. 189-201.
(Continued)

*Primary Examiner* — Jose L Couso
(74) *Attorney, Agent, or Firm* — Faegre Drinker Biddle & Reath LLP

(57) ABSTRACT

A method for processing data in a video sequence comprising impulse noise ("salt-and-pepper", "snow", or other type), comprising, for filtering the noise, an application of a recursive filter (S2), given by:

$z(n)=z(n-1)+\Delta$ if $y(n)>z(n-1)$ $z(n)=z(n-1)-\Delta$ if $y(n)<z(n-1)$ and $z(n)=z(n-1)$ if $y(n)=z(n-1)$ where: y(n) designates an element in the $n^{th}$ image of the succession, not processed by application of the sign filter; z(n−1) designates an element having a position corresponding to y(n), in the $(n-1)^{th}$ image of the succession, and processed by application of the sign filter; z(n) designates an (Continued)

element having a position corresponding to y(n), in the $n^{th}$ image of the succession, and processed by application of said sign filter, and $\Delta$ is a strictly positive coefficient.

14 Claims, 5 Drawing Sheets

(51) Int. Cl.
*G06T 5/20* (2006.01)
*H04N 5/217* (2011.01)
(52) U.S. Cl.
CPC ............ *G06T 2207/10016* (2013.01); *G06T 2207/10024* (2013.01); *G06T 2207/20182* (2013.01)
(58) Field of Classification Search
CPC ........ H04N 9/77; H04N 19/117; H04N 19/85; H04N 19/86; H04N 19/172; G06T 5/002; G06T 5/20; G06T 5/50; G06T 5/007; G06T 5/10; G06T 5/30; G06T 5/003; G06T 5/001; G06T 5/005; G06T 7/254; G06T 7/11; G06T 7/194; G06T 7/12; G06T 2207/10016; G06T 2207/20182; G06T 2207/20012; G06T 2207/20016; G06T 2207/10024; G06T 2207/20004; G06T 2207/20008; G06T 2207/20204; G06T 2207/20192; G06T 2207/10008; G06T 2207/30176; G06T 2207/20028; G06T 2207/30068; G06T 2207/20024; G06T 2207/20032; G06T 2207/20036; G06T 2207/20224; G06T 2207/30148; G06K 9/40; G06K 9/20; G06K 9/0051; G06K 9/00771; G06K 9/325; G06K 9/3258; G06K 9/44; G06K 9/4609; G06K 2209/15
See application file for complete search history.

(56) References Cited

U.S. PATENT DOCUMENTS

| | | | |
|---|---|---|---|
| 7,769,089 B1 | 8/2010 | Chou | |
| 2004/0125236 A1* | 7/2004 | Kempf | H04N 5/213 348/700 |
| 2006/0056724 A1* | 3/2006 | Le Dinh | G06K 9/40 382/274 |
| 2006/0109903 A1* | 5/2006 | Bergen | G06T 5/30 375/240.12 |
| 2008/0056366 A1* | 3/2008 | Bhaskaran | H04N 19/573 375/240.16 |
| 2012/0019727 A1* | 1/2012 | Zhai | H04N 5/145 348/607 |
| 2012/0169936 A1* | 7/2012 | Persson | H04N 5/21 348/609 |
| 2013/0089247 A1* | 4/2013 | Mercuriev | G06T 5/002 382/128 |
| 2013/0208129 A1* | 8/2013 | Stenman | G06T 5/002 348/207.1 |
| 2015/0288856 A1* | 10/2015 | Vanam | H04N 9/646 348/624 |
| 2016/0180504 A1* | 6/2016 | Kounavis | G06T 5/20 348/241 |
| 2016/0232641 A1* | 8/2016 | Kamath | H03H 17/0261 |
| 2017/0154413 A1* | 6/2017 | Yu | G06T 5/002 |
| 2018/0315172 A1* | 11/2018 | Smirnov | G06T 7/0002 |

OTHER PUBLICATIONS

PCT Search Report issued in related application PCT/EP2019/064297, dated Aug. 12, 2019, with English language translation, 7 pages.

* cited by examiner

PROCESSING OF IMPULSE NOISE IN A VIDEO SEQUENCE

CROSS-REFERENCE TO RELATED APPLICATIONS

This application is the U.S. national phase of the International Patent Application No. PCT/EP2019/064297, filed Jun. 3, 2019, which claims the benefit of French Patent Application No. 18 55955, filed Jun. 29, 2018, the entire content of which is incorporated herein by reference.

FIELD

The disclosure relates to noise reduction processing for a video sequence of pixel-based digital images, in particular for correcting a "salt-and-pepper" (or "impulse noise" below) type image noise.

BACKGROUND

However, it can be considered that this noise does not affect an "image background" and one can thus be interested in image processing for estimating the background in real time, with possible applications in:
- restoring video sequences in the presence of impulse noise (also called "salt-and-pepper" noise that is typically found in the presence of radioactive radiation impacting photosites of a sensor, which is seen as a saturation of the corresponding pixels);
- detecting movement in a video sequence, with object tracking (for example in video surveillance), in which a camera, possibly moving, films a fixed scene to which moving elements are added, with objects that move about. For detecting these events, one solution consists of estimating the background and then subtracting it from the image.

Next, one concentrates on the case of a grayscale image (a single value per pixel); the extension to the case of a color image (three channels: red, green, blue) is immediate by applying the same calculation to the three channels.

The case of a pixel of the image is then considered, denoted $y(n)$ for the $n^{th}$ image of the sequence, for which the temporal evolution is tracked, with no need to subsequently specify the spatial coordinates of the pixel.

While keeping the other previously mentioned applications in mind, the case of impulse noise due to radiation can be processed based on a model of degradation of a single pixel $y(n)$ at a given moment n. This model deviates from the conventional model of centered additive noise and can for example be written:

$y(n)=x+u(n)$ with a probability $1-p$
$y(n)=s$ with a probability $p$
x being the exact value of the pixel in the absence of radiation and measurement noise
$u(n)$ being a conventional noise measurement (typically Gaussian white noise), of standard deviation $\sigma_u$
s being the value of a "contaminated" pixel, typically a saturation,
p being the radiation "level"

The probability density $f_Y(y)$ of the values taken by $y(n)$ is written in this example:

$$f_Y(y) = \frac{1-p}{\sqrt{2\pi}\,\sigma_u} \exp\left\{-\frac{(y-x)^2}{2\sigma_u^2}\right\} + p\delta(y-s)$$

$\delta(x)$ being the Dirac delta function of x.

This simple model is not the only possibility. In particular, the contaminated values are not necessarily constant, and radiation is not the only application. We are therefore more generally interested in pixel values having a probability density of the form:

$f_Y(y)=(1-p)f_U(y-x)+pf_S(y)$ where $f_S(y)$ is the distribution of "contaminated" pixels (or those corresponding to a moving object) and $f_U(y-x)$ is the distribution of "uncontaminated" pixels (or those corresponding to a fixed background).

By analogy with the case of radiation noise, these terms "contaminated" and "uncontaminated" are retained below (even though the case of images with radiation is not the only possible application). In the most general case of the salt-and-pepper type impulse noise, the noise values can be both very high (white pixels, saturation) or very low (black pixels), which is a bimodal shape for $f_S(y)$, for example, for noisy pixels oscillating between 0 and the maximum of the values taken by the pixels $I_{max}$:

$$f_S(y) = \frac{p}{2}\delta(y-0) + \frac{p}{2}\delta(y-I_{max})$$

Techniques exist for filtering this type of noise. The two main techniques are given in detail below.

The simplest method consists of using a linear temporal filtering of the values for each pixel. Typically, the sliding average or linear temporal filters such as exponential forgetting are frequently used. Exponential forgetting is defined by:

$z(n)=(1-\alpha)y(n)+\alpha z(n-1)$ where $\alpha$ governs the forgetting factor of the filter (typically between 0.8 and 0.99).

It converges to the average $y_{moy}$ of the values taken by $y(n)$ over time. If s is the average value of the contaminated pixels, then we have:

$y_{moy}=x+p(s-x)$

This value can be substantially different from the exact value x if the radiation level p is high and/or if the average of the uncontaminated values x is far from the "contaminated" value s. For example, for p=20%, a normally black pixel x=0 and a contaminated value at saturation with s=255 gray levels, we have $y_{avg}$=51 gray levels, which is a difference of about 50 gray levels compared to the exact value.

In the case of a camera that is moving or that can change zoom factor, the last output of the filter is reset, in order to follow the various movements or changes in zoom factor of the camera. The corresponding expression is written:

$$z(q, n) = (1-\alpha) \cdot y(q, n) + \alpha \cdot z(T_n(q), n-1)$$

$$z_{restored}(q, n) = \frac{z(q, n)}{N(q, n)}$$

where:
$y(q,n)$ is the value of the $n^{th}$ raw image, for the pixel at position q
$z(q,n)$ is the value of the $n^{th}$ filtered image, for the pixel at position q
$z_{restored}(q,n)$ is the value of the $n^{th}$ restored image, for the pixel at position q $T_n(.)$ is the estimated transformation between the raw images n−1 and n.

α is the forgetting factor of the filter (typically between 0.98 and 0.95)

N(q,n) is the output from the temporal filter when the input is set to a constant image equal to 1 for all pixels.

Less formally, this filtering equation is written:

$$\text{image}_{filtered} = (1-\alpha) \cdot \text{image}_{raw} + \alpha \cdot \text{image}_{filtered,previous,reset}$$

$$\text{image}_{restored} = \frac{\text{image}_{filtered}}{\text{normalisation}}$$

This filtering serves to eliminate the effect of the radiation ("snow" effect in the image).

However, it can be shown that the image so restored does not exactly converge to the image that would have been obtained without the radiation.

Another known technique is the median filter.

It is known to be of interest to choose processing which converges not towards the average but towards the median of the values taken by y(n). In fact, if the impulse noise level is less than 50%, the median of the values taken by y(t) is located in the support of the distribution of x+u(t).

This median is independent of the deviation between the contaminated value s and the exact value x.

In the case of "salt-and-pepper" noise, this median is equal to x. In the case of a "contaminated" pixel still greater than the median, it is shown that this median is given by:

$$y_{med} \approx x + \sqrt{\frac{\pi}{2}} \sigma_u \frac{p}{1-p}$$

which is a small deviation $y_{med}-x<0.32\sigma_u$ for contamination levels observed in practice (for example p<20%)).

The difference between the average and the median is illustrated in FIG. 1, representing an example of the temporal evolution of the values taken by a pixel with a 20% contamination level.

In order to calculate this median over time, the usual processing consists, for each pixel, of calculating the median obtained over sliding time windows. Over each window, the median can be calculated for example by sorting algorithms (the M values taken by the pixel in the time window are sorted and then the value from the middle is taken) or from the histogram of the values taken by the pixel in the window.

This approach has three disadvantages, however:
- the memory requirement is significant (size of the windows, 50 images for two-second time windows and a video frame rate of 25 images/second);
- the processing, which must be done for each pixel and for each new image (each new image corresponds to an update of the time windows), is particularly complex;
- the extension to the case of a camera that is moving and/or is varying the zoom factor is impossible: to do so it would be necessary to readjust the set of images from the sliding window to the last image and then calculate the temporal median for each pixel. The memory required and the processing time become incompatible with a real-time application.

SUMMARY

The disclosed embodiments aim to improve this situation. For this purpose, a method is proposed for processing data in a video sequence comprising noise, for example impulse noise, the video sequence being formed of a succession of images, and the method comprises, for filtering the noise, an application of a recursive filter hereafter called the "sign filter" and given by:

$z(n)=z(n-1)+\Delta$ if $y(n)>z(n-1)$ $z(n)=z(n-1)-\Delta$ if $y(n)<z(n-1)$ and $z(n)=z(n-1)$ if $y(n)=z(n-1)$ where:
- y(n) designates an element in the $n^{th}$ image of the succession, not processed by application of the sign filter;
- z(n−1) designates an element having a position corresponding to y(n), in the $(n-1)^{th}$ image of the succession, and processed by application of the sign filter;
- z(n) designates an element having a position corresponding to y(n), in the $n^{th}$ image of the succession, and processed by application of said sign filter, and
- Δ is a strictly positive coefficient.

As will be seen in the examples of results presented below, such a filter offers the advantage of a median filter in comparison to a conventional temporal filter, which is that it is not degraded by an average of the processed images.

In one implementation, the elements y(n), z(n−1) and z(n) are image pixels, having the same position, and the images from the aforementioned succession are processed pixel by pixel.

Alternatively, processing by blocks of adjacent pixels can be applied to make the processing converge even faster depending on the case.

The aforementioned noise can be impulse noise, for example "salt-and-pepper" or "snow" type.

The impulse noise can for example result from a radioactive radiation received by a sensor of a camera filming the aforementioned video sequence.

Typically in this case, the impulse noise is often "snow" type noise.

With or without "salt-and-pepper" or "snow" type noise, the processing according to an embodiment can be used in video sequence images which present objects moving in front of a background of interest. In this case, these objects moving in the images (dust or other) can be treated as noise, by the method according to an embodiment.

In the case of a moving camera, or a camera with possible changes in the zoom factor, incorporating the apparent movement as input to the sign filter can be provided, for example with a module for estimating movement in successive images.

Thus, in more generic terms, in a method where the succession of images comprises an apparent movement of an image background in the succession of images, the method may further comprise:
- incorporating the apparent movement as input to the sign filter.

Such an "apparent movement" can be caused by at least one of the following situations:
- the camera is mobile and films a fixed sequence, and
- the zoom of the camera is variable with time.

With the above notations given to the pixels, the application of the sign filter in the case of such apparent movement can then be given by:

$z(q,n)=z(T_n(q),n-1)+\Delta$ if $y(q,n)>z(T_n(q),n-1)$ $z(q,n)=z(T_n(q),n-1)-\Delta$ if $y(q,n)<z(T_n(q),n-1)$ $z(q,n)=z(T_n(q),n-1)$ if $y(q,n)=z(T_n(q),n-1)$ with $z(q,n)$ being the values taken by the $n^{th}$ image at the pixel with vector coordinates q and $T_p$ being the estimate of the transformation between the preceding image of rank n−1 and the current image of rank n in the succession.

Preferably, it can be advantageous, for initial images of the succession until the $n_0^{th}$ image, to apply a forgetting-factor temporal filter, without applying sign filtering, this forgetting-factor temporal filter being given by:

$$z(q, n) = \frac{z_{temp}(q, n)}{N(q,n)}$$

where $z_{temp}(q,n) = (1-\alpha)\cdot y(q,n) + \alpha z_{temp}(T_n(q), n-1)$
and $N(q,n) = (1-\alpha) + \alpha \cdot N(T_n(q), n-1)$;

$z_{temp}(q,n)$ being a time variable and $\alpha$ being a forgetting factor included between 0 and 1.

$z(q,n)$ then being the values taken by the $n^{th}$ image at the pixel with vector coordinates q and $T_n$ being the estimate of a transformation by possible movement between the preceding image of rank n−1 and the current image of rank n in the succession, with n less than $n_0$.

In the absence of movement between successive images up to image $n_0$, this forgetting-factor temporal filter can be simply given by:

$$z(n) = \frac{z_{temp}(n)}{1-\alpha^n},$$

with $z_{temp}(n) = (1-\alpha)y(n) + \alpha z_{temp}(n-1)$ $z_{temp}(n)$ being a time variable and $\alpha$ being a forgetting factor included between 0 and 1.

Next, at least for images of the succession which follow an $n_0^{th}$ image, the combination of the sign filter with a forgetting-factor temporal filter can be applied, the result of this combination being given by:

$$s(n) = \frac{w_{temp}(n)}{1-\beta^{n-n_0+1}}$$

$w_{temp}(n)$ being a temporal variable given by:

$w_{temp}(n) = (1-\beta)z(n) + \beta w_{temp}(n-1)$, where $z(n)$ is the result of the application of the sign filter, and where $\beta$ is a forgetting factor included between 0 and 1.

An important parameter to choose is the value of the coefficient $\Delta$. Preferably, this choice is a function of a maximum value, $I_{max}$, of the color level taken by the image elements. Tests show that the coefficient $\Delta$ can be less than $20 \cdot I_{max}/255$.

Preferably, the coefficient $\Delta$ is included between 0 and $5 \cdot I_{max}/255$ (which is between 0 and 5 if $I_{max}=255$ as it most often is).

"Color level" is understood here to be a gray level or a red, green, or blue (RGB) level typically quantified over 256 values.

The disclosed embodiments also concern a computer program comprising instructions for implementation of the above method, when these instructions are executed by a processor. It also concerns an information medium (memory, for example USB or other type) storing instructions for such a program.

The disclosed embodiments also concern a device comprising a processing unit for implementation of the above method (described later with reference to FIG. 5).

BRIEF DESCRIPTION OF THE DRAWINGS

Other advantages and features will become apparent upon reading the detailed description of the disclosed embodiments, presented as illustrative examples, and upon examination of the attached drawings in which.

DETAILED DESCRIPTION

The disclosed embodiments propose a recursive approach as follows: by considering the values taken by a single pixel, denoted y(n) for image n, this approach consists of calculating the series z(n) defined by:

$z(n) = z(n-1) + \Delta \times \text{sign}(y(n)z(n-1))$ where sign(0)=0.

In the following, this approach is called "processing by sign filter" or "fast temporal median."

$\Delta$ is a parameter of the algorithm whose adjustment expresses a compromise between the convergence speed and the residual standard deviation after convergence. Its adjustment is discussed below.

There are multiple advantages to this sign filter.

The required memory remains very small: only two images are used for calculating the output at moment n: the previous output image z(n−1) and the current raw image y(n). The real-time implementation is therefore immediate.

There is nearly no complexity: for each new image and for each pixel, there are one addition, one multiplication, and one comparison (on the sign calculation).

This approach is adapted advantageously and without difficulty to the specific case of a moving camera, for which the recurrence equation becomes:

$z(q,n) = z(T(q), n-1) + \Delta \times \text{sign}(y(q,n)z(T(q), n-1))$ with $z(q,n)$ being the values taken by the image at moment n at the pixel with vector coordinates q, and T being the estimate of the transformation between the preceding image and the current image. Methods for estimating this transformation are described in the literature for a translation and for the combination of a translation, a rotation, and a change of zoom factor.

Figure 6:
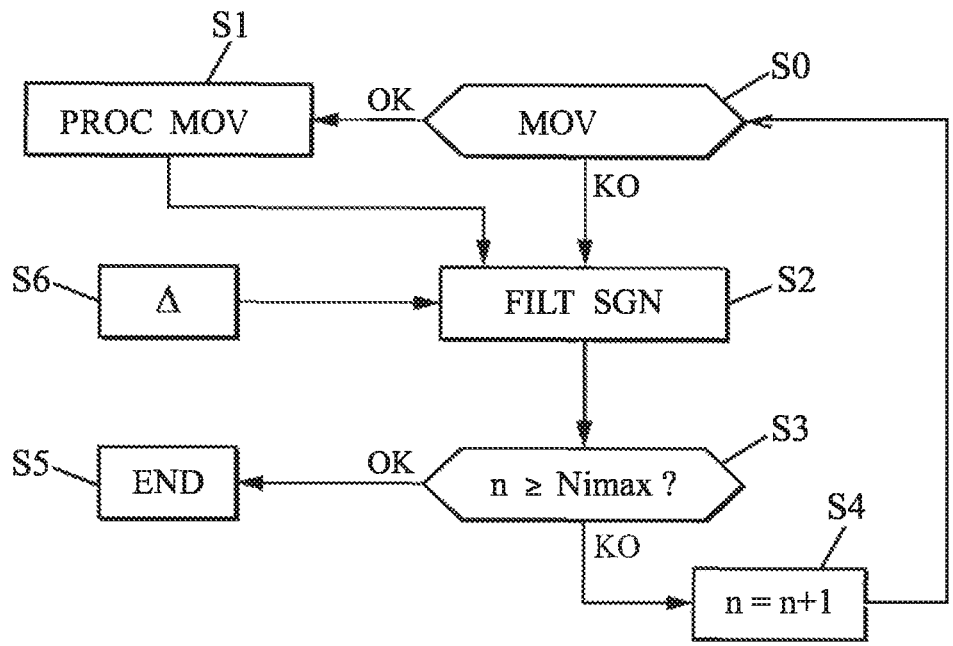
FIG. 6 shows a processing applied to a sequence of images with movement according to an embodiment.

Thus a preliminary to processing the sign may consist of defining whether or not the camera is moving:
- if the camera is fixed, only the processing by sign filter is applied; and
- If the camera is meant to move, and/or if the zoom factor can vary (or the lighting), then, referring to FIG. 6, a preliminary step S1 of estimating the movement of the camera is applied: in a known manner, the displacement of the camera is calculated from successive images and this displacement, thus obtained in step S1, is then incorporated as input to the processing by sign filter to be applied in step S2.

For example, a user can be provided a binary button for specifying whether the sequence was filmed with a fixed camera or moving camera (step S0), the latter case leading to launching the movement estimation algorithm (step S1), the result thereof being taken as input to each iteration of step S2, iteratively over n up to $N_{imax}$ (loop of steps S3 and S4, until S5 for $n=N_{imax}$)

In the preceding general equation, the coefficient $\Delta$ characterizes the importance given to the sign of the difference between the current image y(n) and the preceding image n−1 which has been processed recursively by the method according to an embodiment: z(n−1).

The adjustment of the value of this coefficient $\Delta$ can be done as detailed below. This adjustment results from a compromise between the convergence time of the recursive sign filter and the final pertinence of the output of the filter which can for example be estimated by the variance after convergence.

"Convergence time" is understood to mean both:
- the convergence time at startup of the processing;
- the time for adaptation to camera movements or zoom variations (the pixel in fact corresponding to a new scene element); and
- the time for adaptation to a change of scene, typically a lighting change.

If one wants to give preference to a fast adaptation/convergence time, a high value is chosen for the coefficient $\Delta$.

If one wants to give preference to a small residual variance, a small value is chosen for the coefficient $\Delta$.

Figure 1:
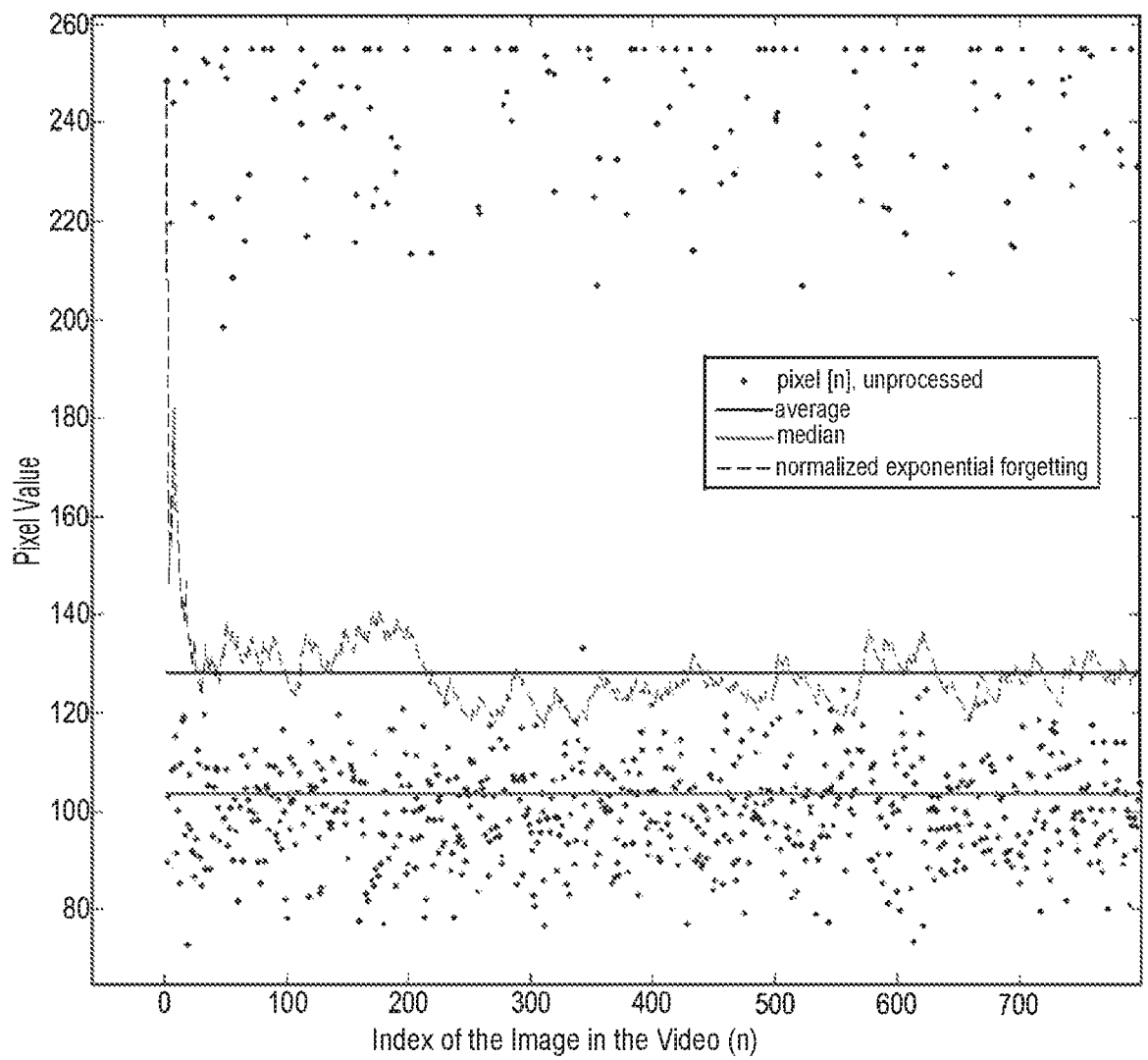
FIG. 1 shows the temporal median and average of the values taken by a pixel which could be contaminated by an impulse noise (p=20%, $\sigma_u$=10 gray levels)
Figure 2:
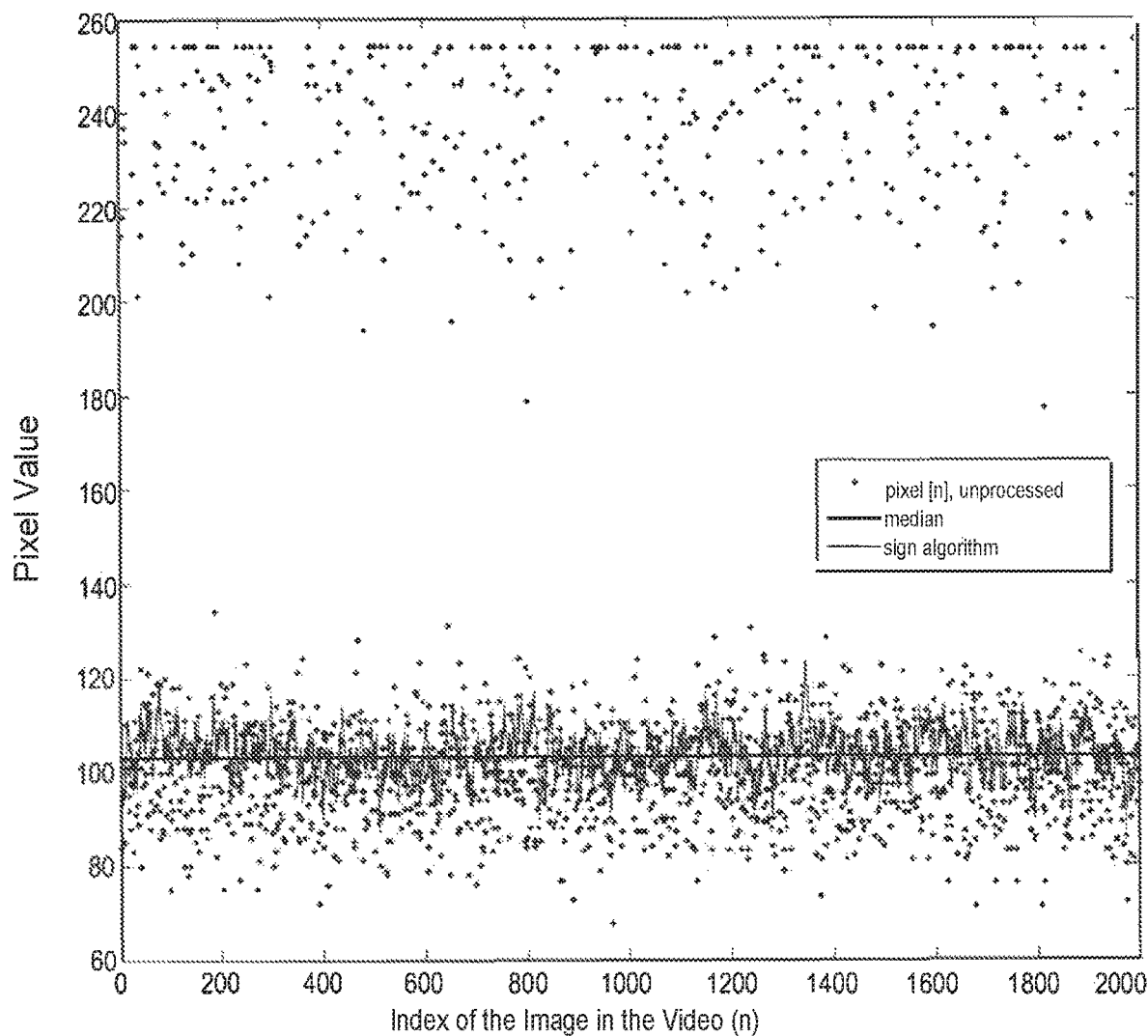
FIG. 2 shows the temporal evolution of a pixel which could be contaminated (p=20%, $\sigma_u$=10 gray levels) and output from the processing by sign filter (with $\Delta=^3$)
Figure 3:
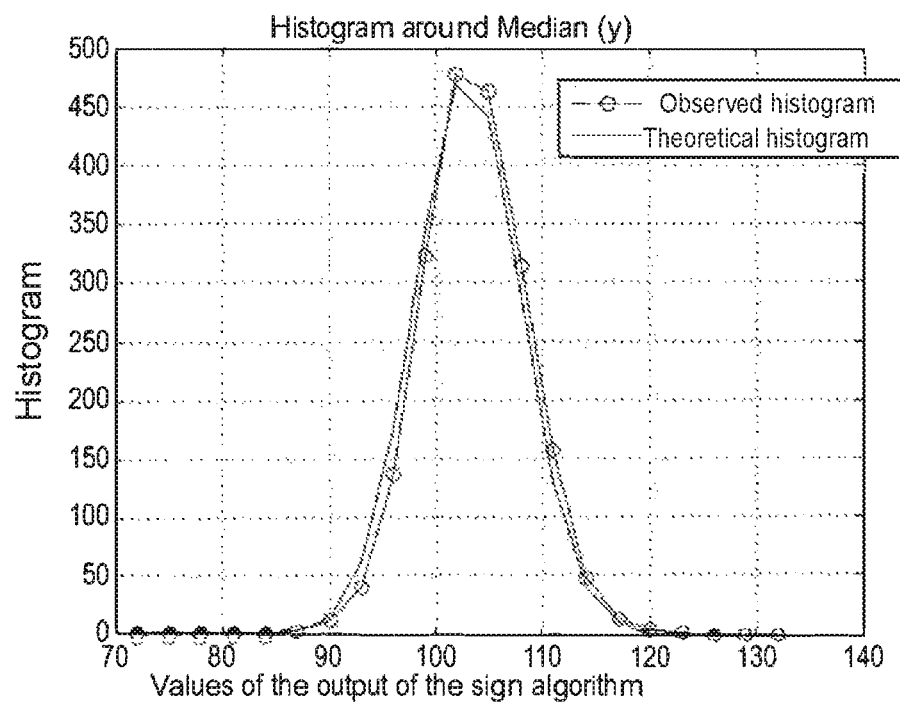
FIG. 3 shows the observed and theoretical distribution of values taken by the output from the processing by sign filter used for the results from FIG. 2 ($\Delta=3$)

FIGS. 2 and 3 respectively show the temporal evolution and the distribution of values taken by the output from the processing by sign filter. This distribution is very close to the theoretical distribution.

Typically, as output from the sign filter, the residual variance after convergence is given by:

$$Vr \approx \sqrt{\frac{\pi}{8}} \times \frac{\Delta \sigma_u}{1-p}$$

The convergence time for a median change of amplitude A is given by:

$$Tc \approx \left| \frac{A}{\Delta(1-p)} \right|$$

Here, the convergence time is given for a "salt-and-pepper" impulse noise comparable to black or white. In the case of pixels contaminated with white only, one would have:

$A/\Delta(1-2p)$ in the case of a drop of the median value, and $A/\Delta$ in the case of an increase of the median value.

The values taken by the pixels of the image are typically between 0 and 255 (the case of 8-bit coded values). In this case, it appears empirically that a good choice of value for the coefficient $\Delta$ may be between 0 and 20, and preferably between 0 and 5. More generally, if the values taken by the pixels are between 0 and $I_{Max}$, the coefficient $\Delta$ can be chosen between 0 and $20 \cdot I_{max}/255$, preferably between 0 and $5 \cdot I_{max}/255$.

The coefficient $\Delta$ may be set as input to the processing by sign filter in step S2, during an initialization step S6 shown in FIG. 6, and it is possible to change it if needed in case the obtained image or the time to obtain it is unsatisfactory. Typically, the processing can be such that a high value is chosen at initialization ($\Delta=5$ for example) and then a small value ($\Delta=1$ for example) after convergence begins. The beginning of convergence can be defined as a function of a sliding window value $n_1$ (a number of successive images $n_1$) for switching from $\Delta=5$ to $\Delta=1$.

The performance of the filter according to an embodiment can be compared with the sliding-window median filter.

The standard deviation of the output from the processing by application of the sign filter can in fact be compared to the standard deviation of the conventional calculation of the median over a sliding window of size N. This can be approximated by the following asymptotic result:

$$\sigma_N = \frac{1}{f_Y(y_{med})\sqrt{4N}}$$

Which, in this context, gives:

$$\sigma_N \approx \sqrt{\frac{\pi}{2N}} \frac{\sigma_u}{1-p}$$

For data values of the noise $\sigma_u$ (standard deviation for "conventional" additive noise, not impulse noise) and contamination level p, the minimum size of the sliding windows needed to obtain the same performance as the sign algorithm proposed here can be deduced:

$$N = \frac{\sqrt{2\pi} \, \sigma_u}{\Delta(1-p)}$$

With for example $\sigma_u=10$ gray levels and p=20%, it is found that the size of the sliding window necessary to obtain the same residual standard deviation is:
N=10 images, for $\Delta=3$,
N=30 images, for $\Delta=1$, and
N=60 images, for $\Delta=0.5$.

One can then consider as a downside to this processing according to an embodiment the compromise to be made between the convergence time and the residual variance after conversion.

However, it is possible to make use of hybrid processing in order to obtain a low residual variance without impacting the convergence time.

A first solution consists of starting the processing with a linear filter, typically a normalized exponential forgetting, and then, after an initialization time $n_0$ of several images, next switching to processing by application of the sign filter.

This type of improvement can be useful in the case of a fixed camera, where a low residual variance is sought without penalizing the initial convergence time. On the other hand, this approach is less effective when needing to adapt quickly to a change of scene (and/or change of lighting or zoom in particular).

In order to reduce the residual variance, a second solution consists of using another linear temporal filter, applied to z(t), typically with exponential forgetting. If β is the coefficient for this second filter (included between 0 and 1), this allows multiplying the residual variance by $$\frac{1-\beta}{1+\beta}(<1)$$

(if it is assumed that the outputs from the sign filter are uncorrelated in time).

This improvement can be particularly useful in the case of a scene which could shift, in order to:
- guarantee tracking of the scene (lighting) and/or of the camera (with a high Δ), and
- guarantee a low residual variance (with the second exponential filter).

The two improvements can be used during a single processing.

The hybrid processing with the two improvements is summarized below, with reference to FIG. 7, in the case of a fixed camera, for a given pixel of value y(n) in the $n^{th}$ image:

For n=0, application of an initialization step S20:

$$y(0)=0, z_{temp}(0)=0, w_{temp}(n_0)=0$$

For n=1 to $n_0$ (loop of steps S22 and S23), application in step S21 of the first forgetting-factor temporal filter, without sign filter:

$$z_{temp}(n) = (1-\alpha)y(n) + \alpha z_{temp}(n-1) \text{ And}$$

$$\text{at output } s(n) = \frac{z_{temp}(n)}{1-\alpha^n}$$

For n>$n_0$ (and until convergence in step S26), application in steps S24 and S25 of the sign filter and respectively of a second forgetting-factor temporal filter to the result of the sign filter:

$$z(n) = z(n-1) + \Delta \times \text{sign}(y(n) - z(n-1))$$

$$w_{temp}(n) = (1-\beta)z(n) + \beta w_{temp}(n-1) \text{ And}$$

$$\text{at output } s(n) = \frac{w_{temp}(n)}{1-\beta^{n-n_0+1}}$$

Figure 4:
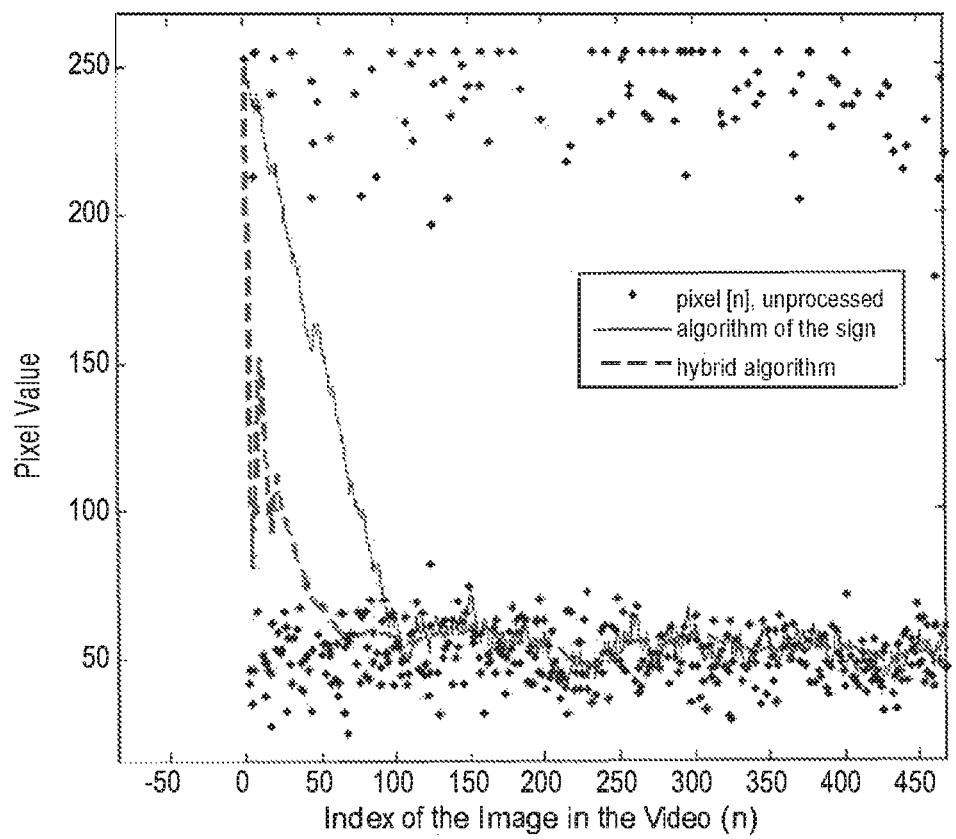
FIG. 4 compares the processing by sign filter ($\Delta=3$) to the hybrid processing using two forgetting-factor temporal filters and the sign filter ($\Delta=3$, $n_0=25$ images, $\alpha=\beta=0.95$) on a sometimes-contaminated pixel ($\sigma_u=10$, p=20%)

The performance of the processing by application of the sign filter and of the hybrid processing with improvements (much better performance in this second case) are illustrated by FIG. 4.

Use of the hybrid processing and adjustment of its parameters (initialization time and exponential forgetting factors) depend on the type of application. For a fixed or slowly moving camera, a small value of the coefficient Δ is sufficient (0.5 or 1 gray level), on condition of initializing the processing with normalized exponential forgetting (α=0.9 for example). The second filter $w_{temp}$) (is not necessarily useful.

For a moving camera, or a variable scene (change of lighting for example), the processing must constantly adapt. A high coefficient of up to Δ=5 gray level could be chosen, followed by exponential forgetting β=0.9. The initialization filter ($z_{temp}$) is not necessarily useful.

For an optimum adjustment of the parameters, calculations comparing the residual variance and the convergence time during a change of median of amplitude A (typically due to a variation of the lighting of the filmed scene) can be helpful.

In fact, in this case, the convergence time (for a salt-and-pepper type "black or white pixel" noise (not just white, "snow" type)) for a change of median of amplitude A (time to reach μA) is given by:

$$Tc \approx \left|\frac{A}{\Delta(1-p)}\right| + \frac{\log(1-\mu)}{\log\beta}$$

The residual variance after convergence can be approximated by:

$$Vr \approx 3 * \sqrt{\frac{\pi}{8}} \times \frac{\Delta\sigma_u}{1-p} \times \frac{1-\beta}{1+\beta}$$

Figure 5:
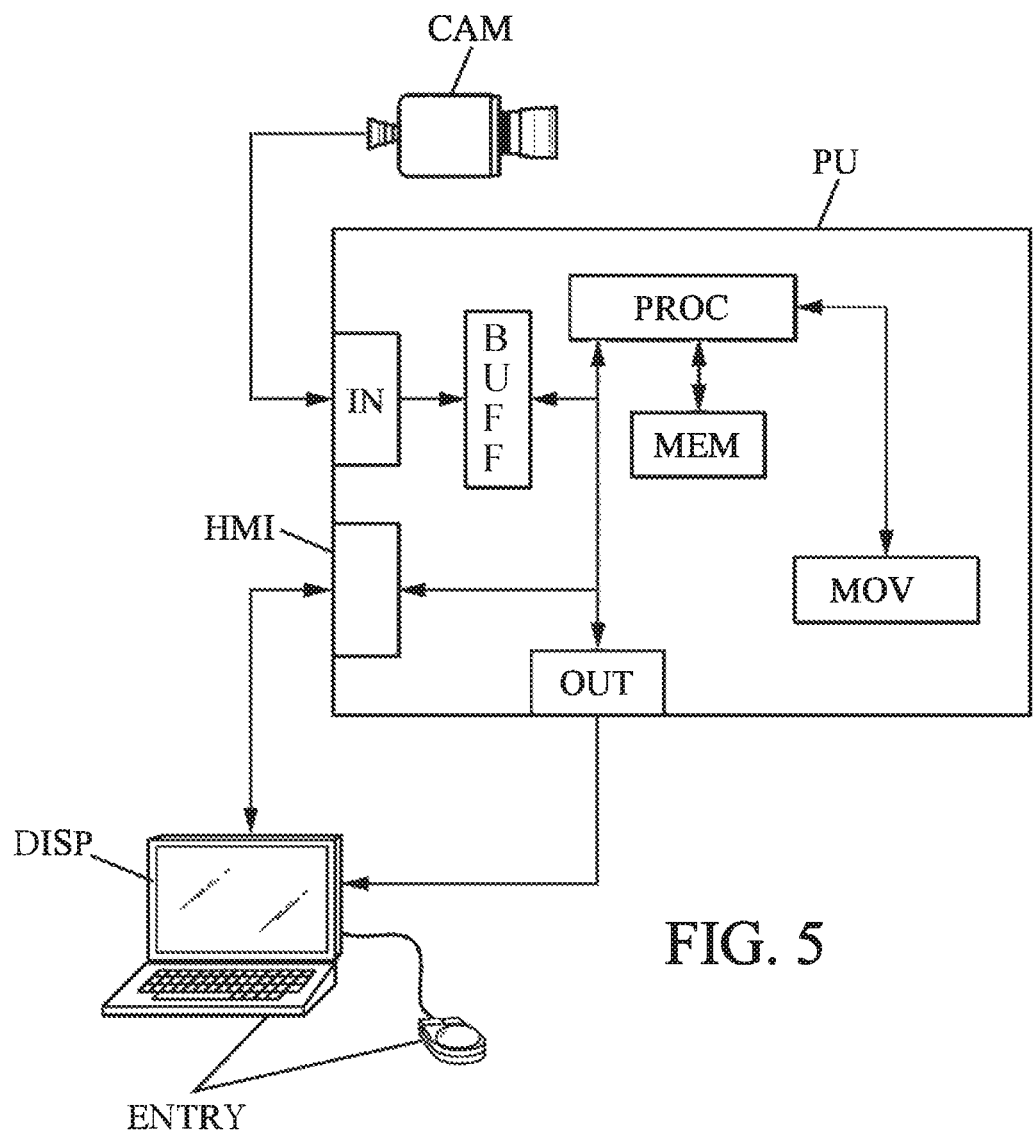
FIG. 5 shows a device for implementation according to an embodiment.

Now referring to FIG. 5, a device according to an embodiment comprises a processing unit UT comprising at least:
- an input interface IN for receiving a signal representative of pixels of successive images forming a video sequence (in fixed plane, and fixed or variable zoom and lighting) from a camera CAM, or even from a remote server (or a remote entity via a communication network);
- a buffer memory BUFF for temporarily storing image data (and typically the last image received (raw) and the last image processed, as well as, in case of movement, the next-to-last image received);
- a memory MEM for possibly storing other temporary variables and especially for storing instruction code of a computer program according to an embodiment, and also possibly parameter values for filters (forgetting factors, coefficient Δ, number of initial images $n_0$, $N_{imax}$, etc.);
- a human-machine interface HMI for entering values of filter parameters, this interface being connected to entry means ENTRY (keyboard, mouse, touchscreen, voice command, etc.) and display means DISP (screen, touchscreen, etc.);
- a processor PROC for reading the instruction code of the computer program from the memory MEM and applying the processing according to an embodiment to the image data from the buffer BUFF, where appropriate by relying on a movement estimation module MOV (estimate of movement of the camera by translation, rotation, zoom factor) if the position of the camera or the adjustments thereof are thought to be variable;
- an output interface OUT for delivering the denoised images which can be viewed on the display means DISP for example.

The processing is done pixel by pixel, to provide an image restored from the value of the pixels at image n.

The output of the processing may present several options:
estimating in a simple manner the background of the video sequence in real time;
detecting and possibly extracting one or more objects moving in the images, by subtraction of the background so obtained from the raw image;
and/or again estimating a salt-and-pepper or snow type impulse noise in the video sequence;
where applicable, restoring the sequence in case this impulse noise is present; and
possibly delivering the images of this background or the denoised images, via the display means DISP or via an interface (not shown) for communicating image data denoised in this manner to a remote site.

The restoration then aims to carry out the following operation:

$$image_{restored} = image_{restored,previous,reset} + \Delta \times sign\{image_{raw} - image_{restored,previous,reset}\}$$

Two conventional filters (exponential forgetting) can be used in addition to this treatment:
a first filter can be used to accelerate the initial convergence time for this processing;
a second filter can be used to reduce the residual variance.

We therefore count four possible combinations of filters:
simple sign filter
sign filter with initialization filter
sign filter with residual variance reduction filter
sign filter with initialization filter and residual variance reduction filter.

The second and fourth combinations are detailed below.

Here, the estimate of the geometric transformation between raw image n−1 and raw image n, denoted $T_n(q)$, is used. Continuing to denote the input images $y(q,n)$ and the output images $z_{restored}(q,n)$, the following steps may be applied:

Initialization: $z(q, 0)=0$; $z_{restored}(q,0)=0$; $T_1(q)=q$ (transformation identity);
$N(q,0)=0$ (normalization image)
For n=1 to $n_0$, . . . $z(q,n)=(1-\alpha) \cdot y(q,n)+\alpha z(T_n(q),n-1)$
$N(q,n)=(1-\alpha)+\alpha \cdot N(T_n(q),n-1)$
and $$z_{restored}(q, n) = \frac{z(q, n)}{N(q, n)};$$

For $n > n_0$:

$$z_{restored}(q,n) = z_{restored}(T_n(q),n-1) + \Delta \times sign\{y(q,n) - z_{restored}(T_n(q),n-1)\}$$

The following can be chosen as input values:
$n_0=25$ images (1 second); it is possible to go up to 50 images (2 seconds)
$\Delta=3$ (between 0 and 10)
This value of $\Delta$ corresponds to pixel values varying between 0 and 255. For the case of pixels varying between 0 and 1, it is necessary to multiply by 1/255. For the case of pixels varying between 0 and MAX, it is necessary to multiply by MAX/255.

This algorithm makes use of the values:

$$z(T_n(q),n-1), N(T_n(q),n-1) \text{ and } z_{restored}(T_n(q),n-1),$$

which are sometimes not available when the estimated transformation $T_n(q)$ removes a pixel from the image (because of movement of the image).

In this case, one could then choose the following values:

$$z(T_n(q),n-1)=0$$

$$N(T_n(q),n-1)=0$$

$$z_{restored}(T_n(q),n-1)=y(q,n) \text{ or } 0$$

Figure 7:
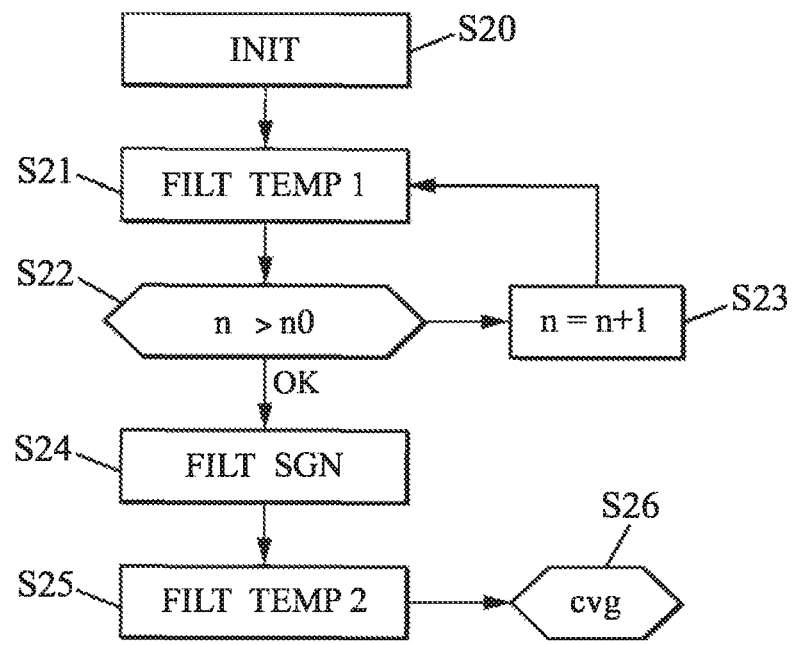
FIG. 7 shows a processing according to an embodiment with two forgetting-factor filters, prior (Filt temp1) to the sign filter (FILT SGN) and concomitant (Filt temp2) with the sign filter.

We will now describe the fourth combination, corresponding therefore to the representation in FIG. 7 as previously discussed. It involves the application of the sign filter with a preliminary initialization filter and a concomitant residual variance reduction filter.

The processing can be presented as follows:
Initialization: $z(q,0)=0$; $T_1(q)=_t q$; $z_{temp}(q,0)=0$; $z_{restored}(q,0)=0$; $N(q,0)=0$
and $z_{restored,bis}(q,0)=0$
For n=1 to $n_0$, the same processing as before is retained, with:

$$z(q, n) = (1 - \alpha) \cdot y(q, n) + \alpha \cdot z(T_n(q), n - 1)$$

$$N(q, n) = (1 - \alpha) + \alpha \cdot N(T_n(q), n - 1) \text{ and}$$

$$z_{restored}(q, n) = \frac{z(q, n)}{N(q, n)}$$

$$z_{restored,bis}(T(q), n_0) = z_{restored}(q, n_0)$$

next, for $n > n_0$, the processing becomes a combination, for each pixel of image n, of a sign filter:

$$z_{restored}(q,n) = z_{restored}(T_n(q),n-1) + \Delta \times sign\{y(q,n) - z_{restored}(T_n(q),n-1)\}$$

and a forgetting filter:

$$z_{temp}(q,n) = (1-\beta) z_{restored}(q,n) + \beta \times z_{temp}(q,n-1)$$

such that:

$$z_{restored,bis}(q, n) = \frac{z_{temp}(q, n)}{1 - \beta^{n-n_0}}$$

By default, we can take $\alpha=0.95$ and $\beta=0.9$
Here again, this processing involves the values:
$z(T_n(q),n-1)$, $N(T_n(q),n-1)$ and $z_{restored}(T_n(q),n-1)$, which may not be available when the estimated transformation $T_n(q)$ removes a pixel from the image (because of movement of the image).

In this case, one could then choose the following values:

$$z(T_n(q),n-1)=0$$

$$N(T_n(q),n-1)=0$$

$$z_{restored}(T_n(q),n-1)=y(q,n) \text{ or } 0$$

It is thus shown that the recursive real-time estimation of the background of a video sequence allows restoring films highly degraded by impulse noise ("salt-and-pepper" or "snow" or actual dust (loose paper, particles, etc.) hiding a useful background and thus similar to impulse noise), without denaturing the original image as occurs with a linear filter applying an undesirable form of averaging to the succession of pixels.

The advantages of the processing proposed here are multiple: the complexity and required memory are very low because the update of one pixel for image n is done using only the previously processed value (output n−1) and that of the current pixel (image n). The real-time implementation is therefore immediate, unlike an implementation based on conventional median filters. Furthermore, the processing is directly applicable to the case of a moving camera.

The invention claimed is:

1. A method for processing data in a video sequence comprising noise, the video sequence being formed of a succession of images, the method comprising, for filtering the noise, an application of a recursive filter hereafter called the "sign filter" and given by:

$z(n)=z(n-1)+\Delta$ if $y(n)>z(n-1)$ $z(n)=z(n-1)-\Delta$ if $y(n)<z(n-1)$ and $z(n)=z(n-1)$ if $y(n)=z(n-1)$ where:
- $y(n)$ designates a pixel element in the $n^{th}$ image of the succession, not processed by any application of the sign filter;
- $z(n-1)$ designates a pixel element having a position corresponding to the position of $y(n)$, in the $(n-1)^{th}$ image of the succession, and processed by application of the sign filter;
- $z(n)$ designates a pixel element having a position corresponding to the position of $y(n)$, in the $n^{th}$ image of the succession, and processed by application of said sign filter, and
- $\Delta$ is a strictly positive coefficient.

2. The method according to claim 1, wherein the images from the succession are processed pixel by pixel.

3. The method according to claim 1, wherein the noise is at least one of a "salt-and-pepper" and "snow" type impulse noises.

4. The method according to claim 1, wherein the noise is impulse noise and results from a radioactive radiation received by a sensor of a camera filming said video sequence.

5. The method according to claim 1, wherein the images of said video sequence present objects moving in front of a background of interest and said objects moving in the images are treated as noise.

6. The method according to claim 1, wherein the succession of images comprises an apparent movement of an image background in the succession of images, and wherein the method further comprises:
incorporating the apparent movement as input to the sign filter.

7. The method according to claim 6, wherein the elements $y(n)$, $(n-1)$ and $z(n)$ are image pixels, having the same position, the images from the succession being processed pixel by pixel, and wherein the application of the sign filter in the case of apparent movement is given by:

$z(q,n)=z(T_n(q),n-1)+\Delta$ if $y(q,n)>z(T_n(q),n-1)$ $z(q,n)=z(T_n(q),n-1)-\Delta$ if $y(q,n)<z(T_n(q),n-1)$ $z(q,n)=z(T_n(q),n-1)$ if $y(q,n)=z(T_n(q),n-1)$ with $z(q,n)$ being the values taken by the $n^{th}$ image at the pixel with vector coordinates q and $T_n$ being the estimate of the transformation between the preceding image of rank n−1 and the current image of rank n in the succession.

8. The method according to claim 1, wherein, for the initial images of the succession until the $n_0^{th}$ image, a forgetting-factor temporal filter is applied, without applying sign filtering, this forgetting-factor temporal filter being given by:

$$z(q,n) = \frac{z_{temp}(q,n)}{N(q,n)}$$

where $z_{temp}(q,n)=(1-\alpha)\cdot y(q,n)+\alpha z_{temp}(T_n(q),n-1)$
and $N(q,n)=(1-\alpha)+\alpha\cdot N(T_n(q),n-1)$;

$z_{temp}(q,n)$ being a time variable and $\alpha$ being a forgetting factor included between 0 and 1.

$z(q,n)$ then being the values taken by the $n^{th}$ image at the pixel with vector coordinates q and $T_n$ being the estimate of a transformation by possible movement between the preceding image of rank n−1 and the current image of rank n in the succession, with n less than $n_0$.

9. The method according to claim 8, wherein, in the absence of movement between successive images up to image $n_0$, the forgetting-factor temporal filter is given by:

$$z(n) = \frac{z_{temp}(n)}{1-\alpha^n},$$

with $z_{temp}(n)=(1-\alpha)y(n)+\alpha z_{temp}(n-1)$ $z_{temp}(n)$ being a time variable and $\alpha$ being a forgetting factor included between 0 and 1.

10. The method according to claim 1, wherein, at least for images of the succession which follow an $n_0^{th}$ image, the combination of the sign filter with a forgetting-factor temporal filter is applied, the result of this combination being given by:

$$s(n) = \frac{w_{temp}(n)}{1-\beta^{n-n_0+1}}$$

$w_{temp}(n)$ being a temporal variable given by:
$w_{temp}(n)=(1-\beta)z(n)+\beta w_{temp}(n-1)$, where $z(n)$ is the result of the application of the sign filter, and where $\beta$ is a forgetting factor included between 0 and 1.

11. The method according to claim 1, wherein a value of the coefficient $\Delta$ is chosen as a function of a maximum value, $I_{max}$, of the color level taken by the image elements, and in that the coefficient $\Delta$ is less than $20\cdot I_{max}/255$.

12. The method according to claim 11, wherein the coefficient $\Delta$ is included between 0 and $5\cdot I_{max}/255$.

13. A non-transitory computer storage medium, storing data of instructions of a computer program for implementing the method according to claim 1, when said instructions are executed by a processor.

14. A device comprising a processing unit comprising at least an input interface to receive data of a video sequence being formed of a succession of images, at least one memory to store temporarily said data, and a processor to process said data for implementing the method according to claim 1.

* * * * *